United States Patent [19]
Jensen et al.

[11] Patent Number: 6,078,926
[45] Date of Patent: Jun. 20, 2000

[54] METHOD AND APPARATUS FOR PERFORMING MULTI-CLASS OBJECT FETCH IN A DATABASE MANAGEMENT SYSTEM

[75] Inventors: Richard H. Jensen, Pacifica; Shailesh Agarwal, Fremont, both of Calif.

[73] Assignee: Persistence Software, Inc., San Mateo, Calif.

[21] Appl. No.: 08/993,376

[22] Filed: Dec. 18, 1997

[51] Int. Cl.$^7$ ................................................. G06F 17/30
[52] U.S. Cl. .................................. 707/103; 707/2; 707/3
[58] Field of Search ................................ 707/103, 2, 3, 707/4, 100, 102

[56] References Cited

U.S. PATENT DOCUMENTS

| | | | |
|---|---|---|---|
| 5,499,371 | 3/1996 | Henninger et al. ...................... | 395/700 |
| 5,765,159 | 6/1998 | Srinivasan ............................... | 707/102 |
| 5,799,309 | 8/1998 | Srinivasan ............................... | 707/102 |

OTHER PUBLICATIONS

M.R. Blaha, W.J. Premerlani, and J.E. Rumbaugh, "Relational Database Design Using an Object–Oriented Approach, " Communications of the ACM, vol. 31, No. 4, Apr. 1988, pp. 414–427.

Barsalou, T., Siambela, N., Keller, A.M., & Wiederhold, G., Updating Relational Databases through Object–Based Views, ACM SIGMOD Proceedings, Denver, CO, May 1991.

J. Duhl and C. Damon, "A Performance Comparision of Object and Relational Databases Using the Sun Benchmark," OOPSLA Notices, vol. 23, No. 11, Nov. 1988, pp. 153–163.

J.A. Goguen and J. Meseguer, "Unifying Functional, Object–Oriented and Relational Programming With Logical Semantics," *Research Directions in Object–Oriented Programming,* B. Shriver and P. Wegner, Editors, The MITT Press, Cambridge, Massachusetts, 1987, pp. 417–477.

Keller, A.M., Updating relational databases through views, Ph.D. Dissertation, Department of Computer Science, Stanford University, Feb. 1985.

Keller, A.M., Agarwal, S. & Jensen, R., Enabling the Integration of Object Applications With Relational Databases, ACM SIGMOD Proceedings, 1993.

Keller, A.M., & Basu, J., A Predicate–based Caching Scheme for Client–Server Database Architectures, VLDB Journal, 1993.

W.J. Premerlani, M.R. Blaha, J.E. Rumbaugh, and T.A. Varwig, "An Object–Oriented Relational DBMS," Communications of the ACM, vol. 33, No. 11, Nov. 1990, pp. 99–109.

Weiderhold, G., Mediators in the Architecture of Future Information Systems, IEEE Computer, Mar. 1992.

*Primary Examiner*—Paul V. Kulik
*Attorney, Agent, or Firm*—Townsend and Townsend and Crew; Kenneth R. Allen

[57] ABSTRACT

A method and apparatus is provided for populating an object-oriented data structure from data stored in a conventional relational database. In particular, a method and apparatus is provided for transforming the results of a complex relational database query such as a join query (i.e., where each row of results from the relational database corresponds to data from multiple tables) into a network of inter-related heterogeneous objects contained an object-oriented data structure. Further, the present invention provides a method and apparatus for more efficiently knitting the relationships between newly created objects in an object-oriented data structure.

3 Claims, 13 Drawing Sheets

METHOD AND APPARATUS FOR PERFORMING MULTI-CLASS OBJECT FETCH IN A DATABASE MANAGEMENT SYSTEM

BACKGROUND OF THE INVENTION

The present invention relates generally to databases and database management systems. More specifically, the present invention relates to systems for dynamically retrieving information stored in a relational database using a join query and transforming the same into a form suitable for storage in a network of heterogeneous object-oriented data structures manipulable by an object-oriented application.

A. Relational Database Management Systems Generally

Relational databases store data tables. Each table includes data arranged in a plurality of records, with each record represented as a plurality of rows in the table. Each record/row generally includes a primary key data element and one or more data elements defining attributes of the keyed item. For example, in an EMPLOYEE table, the primary key might be the employee number of an employee. Attributes of the employee might include the employee's first name, last name, and the employee's status as either hourly or salaried. A record might also include one or more foreign key data elements which indicate how that record in the table is related to another record in a separate table. For example, in the EMPLOYEE table, a DEPARTMENT foreign key would indicate the relationship of an employee to a record in a DEPARTMENT table.

A relational database management system (RDBMS) constructs views of the data in a relational database by issuing a Structured Query Language (SQL) join query to select data from one or more tables in the relational database. The results of the join query are then loaded into a single results table.

The following example illustrates this process. A certain relational database stores information relating the departments of a company in one table, and information relating to the employees of the company in another table. To view the attributes of all of the employees in the engineering department, for example, one issues an SQL "join" query to select data from the "DEPARTMENT" table and the "EMPLOYEE" table. The resulting data is loaded into a single results table such that each row of the results table includes attributes from both the DEPARTMENT table and the EMPLOYEE table.

B. Object-Oriented Data Structure and Applications

Object-oriented applications organize routines together with the data operated upon by the routines into discrete units referred to as "objects." The objects then exist in an object-oriented data structure manipulable by the object-oriented application. Each object in the object-oriented data structure represents an instance of a "class." A class abstractly defines the characteristics of each object in the class. For example, in a STUDENT class, objects may be defined as having a student ID, a name, a major, and a GPA. An object of the STUDENT class might be a student named Ed Jones, having a student ID of 123-45-6789, a Computer Science Major, with a GPA of 3.65.

Sub-classes may also be defined for a given class. For example, for the STUDENT class described above, a sub-class of GRADUATE STUDENT may be defined which has all of the characteristics of a STUDENT but which also has certain characteristics unique to a GRADUATE STUDENT (e.g., a graduate advisor, a graduate thesis topic). An object of a sub-class then "inherits" the characteristics of the class from which it is derived (e.g., on object of the GRADUATE STUDENT class "inherits" the fact that it has an ID, a name, a major and a GPA from the STUDENT class).

The relationship of one object to another may be defined implicitly or explicitly. An implicit relationship between objects occurs through class inheritance as described above. An explicit relationship occurs between objects when an explicit link is defined via a pointer, a linked list, etc. to indicate the relationship of one object to another object or objects in the object-oriented data structure.

Object-oriented applications (e.g., an object-oriented database management system) have the facility to navigate quickly and efficiently through data that is organized as a network of heterogeneous inter-related objects. Hence, as compared to RDBMS's, object-oriented applications are preferable for performing certain data navigation operations that are more cumbersome for a traditional RDBMS. A simple example is the bill of materials problem where, for example, one wants to navigate all of the components which make up a lawnmower in order to determine the total weight of the lawnmower. One can easily represent the lawnmower as a network of inter-related objects (i.e., a plurality of parts related to each other in a pre-determined way). Hence, once the desired part is represented in an object-oriented data structure, the total weight is calculated easily by navigating through the objects and summing their respective weights. In comparison, calculating the weight of the lawnmower using a traditional RDBMS alone potentially requires hundreds of join queries—a cumbersome and tedious exercise. For a more detailed explication of the bill of materials problems, the reader is referred to the text *File Organization for Database Design* by George Wiederhold (McGraw-Hill, 1987), which is hereby incorporated by reference.

C. Transforming Relational Database Information into Object-Oriented Form

Because of the large volume of data which is already stored in traditional relational database form, systems for transforming relational-database data into a form suitable for manipulation by an object-oriented application have been developed. One such system is disclosed in U.S. Pat. No. 5,615,362 entitled METHOD AND APPARATUS FOR MANAGING RELATIONAL DATA IN AN OBJECT CACHE, which is hereby incorporated by reference for all purposes.

The above-identified patent describes a method and apparatus for managing a single cohesive object-oriented data structure (e.g., an object cache) with a plurality of inter-related objects representing information retrieved from a relational database. The object cache is suitable for manipulation by an object-oriented application program.

When the object-oriented application attempts to perform an operation on information which is not currently in the object-oriented data structure (i.e., the object does not exist), the apparatus and method described in U.S. Pat. No. 5,615,362 composes one or more relational database queries to retrieve the required information from the relational database. Each query addresses a single table or view, and the results of each query are mapped into a single class of objects.

FIG. 1 illustrates the prior art method for transforming one or more results tables into a network of heterogeneous inter-related objects in an object-oriented data structure. Relational database 99 includes two tables, TABLE A and TABLE B. TABLE A includes three records, A1, A2, and A3, and TABLE B includes at least four records, B1, B2, B3 and B4. The records of TABLE B also include foreign key information indicating how the records in TABLE B correspond to the records in TABLE A. The described method composes four separate queries to produce the results tables 81, 83, 85, 87 shown in FIG. 1.

The prior art method composes a first query to retrieve all of the records of TABLE A. An exemplary SQL query is as follow:

SELECT * FROM TableA

Results table 81 is the product of the above query. The method then transforms the three rows of results table 81, R1, R2, and R3, into the three objects, A1, A2 and A3, respectively, of CLASS A in object-oriented data structure 79.

The prior art method composes a second query to retrieve all of the records of TABLE B where the foreign key equals "A1." An exemplary SQL query is as follows:

SELECT * FROM TableB WHERE fkB='A1'

In this case, two records satisfy the query thereby producing results table 83. The method transforms the two rows, R1 and R2, of results table 83 into two objects, B1 and B2, of CLASS B as shown. In addition, the method uses the foreign key information in each row of results table 83 to define the relationships between objects B1 and B3 of CLASS B and object A1 of CLASS A.

The prior art method composes a third query to retrieve all of the records of TABLE B where the foreign key equals "A2." An exemplary SQL query is as follows:

SELECT * FROM TableB WHERE fkB='A2'

In this case, one record satisfies the query thereby producing results table 85. The method then transforms the single row R1 of results table 85 into object B2 of CLASS B as shown. In addition, the method uses the foreign key information in R1 of results table 85 to define the relationship between object B2 and object A2.

The prior art method composes a fourth query that retrieves all of the records of TABLE B where the foreign key equals A3. An exemplary SQL query is as follows:

SELECT * FROM TableB WHERE fkB='A3'

In this case, one row of TABLE B satisfies the query thereby producing results table 87. The method transforms row R1 of results table 87 into object B4 of CLASS B as shown. In addition, the method uses the foreign key information in R1 of results table 87 to define the relationship between object B4 of CLASS B and object A3 of CLASS A.

The foregoing method is limited in that a single row of a results table can be transformed into a single object only. Because of this limitation, the described method is restricted to composing only simple queries which operate on only a single relational database table at a time. This approach is does not take full advantage of the power of current relational database management systems which can form complex queries which operate on multiple tables of the relational database at a time. It would be desirable, therefore, to provide a method and system for transforming relational database information into an object-oriented data structure which can transform the results of more complex relational database queries into an object-oriented form. Such a method and system would provide greater efficiency in populating an object-oriented data structure from data stored in a relational database.

D. Prior Art References

The following publications are believed to relate to the general background of the present invention and are presented herein to satisfy the duty of disclosure. It is not believed that any one is specifically relevant to the claimed invention.

M. R. Blaha, W. J. Premerlani, and J. E. Rumbaugh, "Relational Database Design Using an Object-Oriented Approach," Communications of the ACM, Vol. 31, No. 4, April 1988, pp. 414–427.

Barsalou, T., Siambela, N., Keller, A. M., & Wiederhold, G., Updating Relational Databases through Object-Based Views, ACM SIGMOD Proceedings, Denver, Colo., May 1991.

R. G. G. Cattell, Object Data Management: Object-Oriented and Extended Relational Database Systems, Addison-Wesley Publishing Company, Reading, Mass., 1991.

J. Duhl and C. Damon, "A Performance Comparison of Object and Relational Databases Using the Sun Benchmark," OOPSLA '88 Conference Proceedings, special issue of SIGPLAN Notices, Vol. 23, No. 11, November 1988, pp. 153–163.

J. A. Goguen and J. Meseguer, "Unifying Functional, Object-Oriented and Relational Programming With Logical Semantics," *Research Directions in Object-Oriented Programming*, B. Shriver and P. Wegner, Editors, The MIT Press, Cambridge, Mass., 1987, pp. 417–477.

Gray, J., & Reuter, A., Transaction Processing: Concepts and Techniques, Morgan Kaufman, San Mateo, Calif., 1993.

Keller, A. M., Updating relational databases through views, Ph.D. Dissertation, Department of Computer Science, Stanford University, February, 1985.

Keller, A. M., Agarwal, S. & Jensen, R., Enabling The Integration of Object Applications With Relational Databases, ACM SIGMOD Proceedings, 1993.

Keller, A. M., & Basu, J., A Predicate-based Caching Scheme for Client-Server Database Architectures, VLDB Journal, 1995.

Nag, B. & Zhao, Y., Implementing the 007 Benchmark on Persistence, Master's Thesis, Computer Sciences Department, University of Wisconsin-Madison.

W. J. Premerlani, M. R. Blaha, J. E. Rumbaugh, and T. A. Varwig, "An Object-Oriented Relational DBMS," Communications of the ACM, Vol. 33, No. 11, November 1990, pp. 99–109.

Wiederhold, G., Mediators in the Architecture of Future Information Systems, IEEE Computer, March 1992.

SUMMARY OF THE INVENTION

According to the invention, a method and apparatus are provided for populating an object-oriented data structure from data stored in a conventional relational database. In particular, a method and apparatus are provided for transforming the results of a complex relational database query, such as a "join" query (i.e., where each row of results from the relational database corresponds to data from multiple tables) into a network of heterogeneous inter-related objects contained an object-oriented data structure. Further, the present invention provides a method and apparatus for more efficiently "knitting" the relationships between newly created objects in an object-oriented data structure.

According to one aspect of the invention, a method for populating an object cache from data stored in a relational database includes the steps of (a) retrieving one or more rows or data from the relational database, such that each of the rows is the result of a join query of two or more tables of the relational database which are related by foreign key-primary key information; (b) creating a network of heterogeneous inter-related objects from the retrieved rows by doing the following for each retrieved row: (i) using an object-to-relational mapping to convert primary key and attributes data in the row into two or more existing or new objects in the object-oriented data structure; and (ii) using the object-to-relational mapping to convert the foreign key data in the row into one or more relationships between the two or more objects.

According to another aspect of the invention, an apparatus includes a computer system programmed to execute the above-described method.

These and other aspects of the invention may be appreciated by reference to the remaining portions of the specification and to the drawings.

DESCRIPTION OF THE PREFERRED EMBODIMENT

A. System Overview

Figure 1:
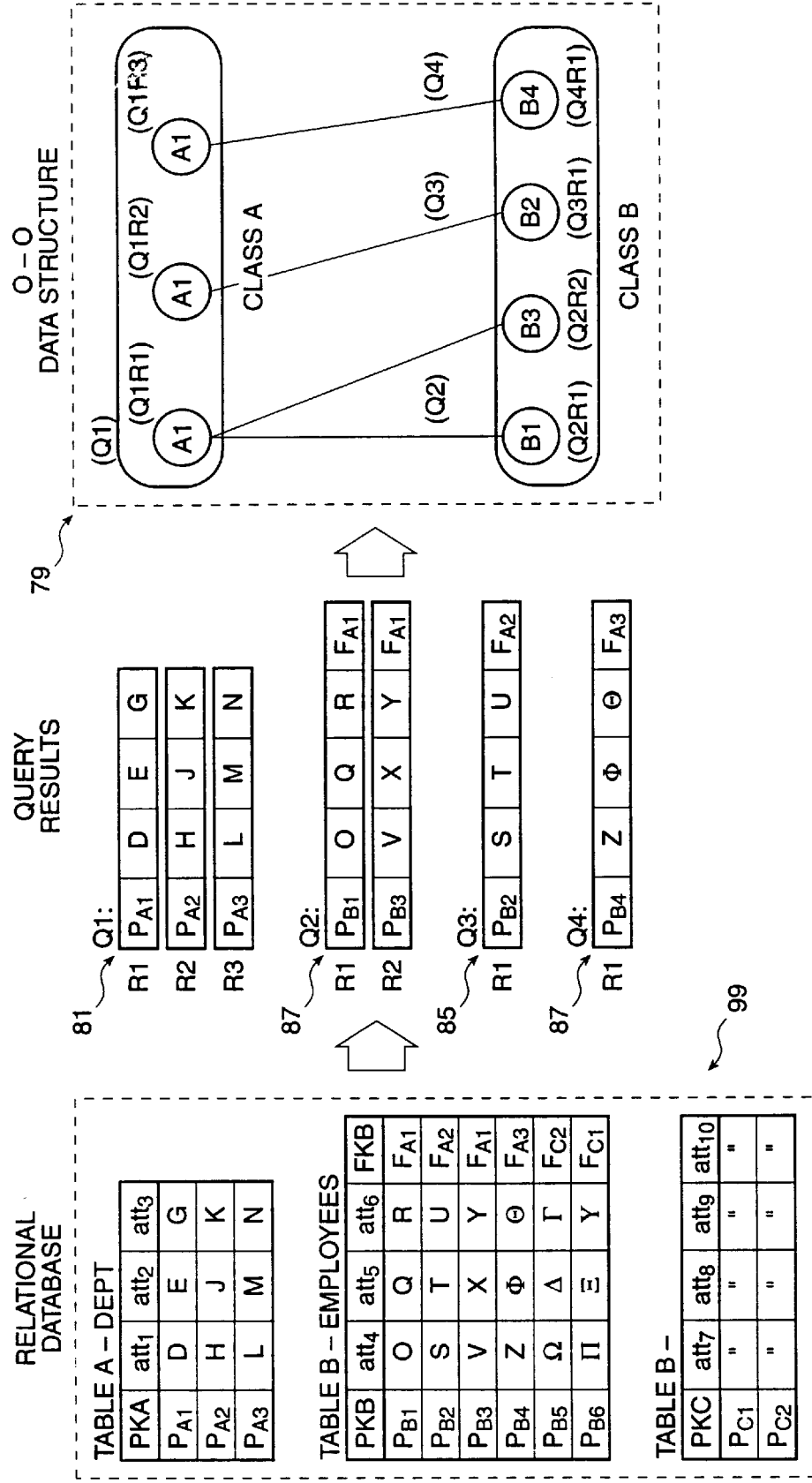
FIG. 1 is a graphical schematic diagram for illustrating the prior art method for populating an object-oriented data structure from data stored in a relational database.
Figure 2:
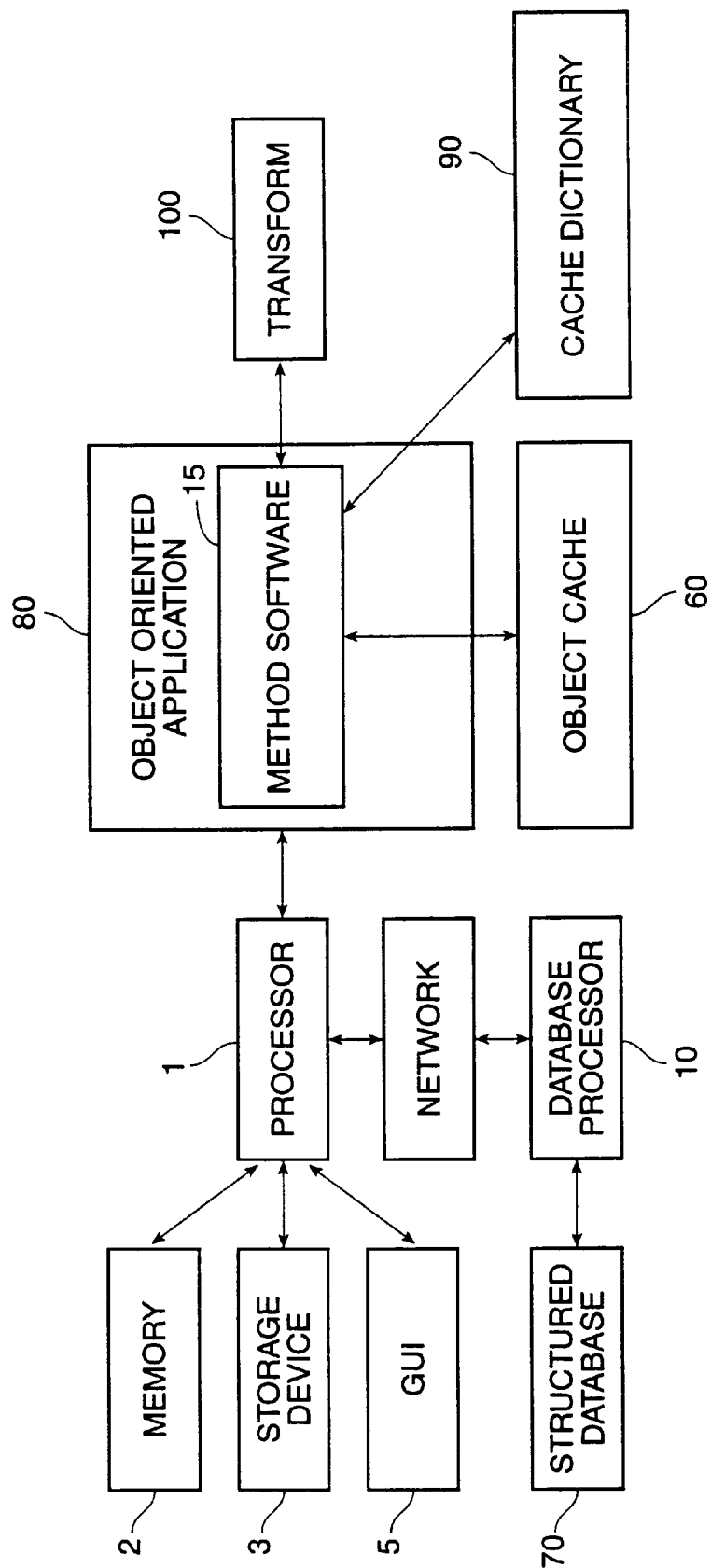
FIG. 2 is a block diagram of a computer system which is programmable to operate according to the present invention.

FIG. 2 illustrates a digital computing system suitable to implement the method of the present invention in a typical embodiment. The system comprises computing hardware and related system software that together support the execution of method software 15, which is software that carries out the steps of the method of the invention. More particularly, the system of FIG. 1 comprises a processor 1 that is coupled to a memory 2, a storage device 3 (such as a hard disk), and a user interface such as a graphical user interface 5.

The processor 1 can also be coupled to one or more structured databases comprising software and associated data. In the illustrated embodiment there is one structured database 70. Structured database 70 has its own associated hardware including a database processor 10 which communicates via network 7 with processor 1. In other embodiments the structured database 70 is a software entity that is executed by processor 1, and network 7 is not present. It will be appreciated by those of skill in the art that a wide range of computing system configurations can be used to support the method of the present invention including, for example, configurations that employ multiple processors and multiple databases.

Method software 15 is incorporated in object-oriented application 80 which is executed by processor 1. Method software 15 implements capabilities for mapping between structured database 70 and object cache 60 according to the object-to-relational transform 100. Transform 100 specifies how relational columns map into objects attributes, how primary key columns map into object IDs, and how foreign keys map into object relationships. In particular, method software 15 processes requests from object-oriented application 80 to retrieve information from structured database 70 and map that information into heterogeneous objects in the object cache 60; to navigate relationships between objects in object cache 60; to delete references to object instances in object cache 60; to commit transactions in structured database 70; and to begin transactions in structured database 70.

Method software 15 makes use of certain components that are also shown in FIG. 1. Among these components are an object cache 60 and a cache dictionary 90.

The method uses pointers, or references, between object instances in object cache 60 to follow relationships between object instances rapidly in response to requests from object-oriented application 80. Using the object cache 60, the method reduces the number of queries sent to structured database 70, thereby increasing performance. Object cache 60 can be stored in memory 2, in storage device 3, or in some combination of memory 2 and storage device 3. Typically, access to object cache 60 is much faster than access to structured database 70. It will be appreciated that in some embodiments additional object-oriented applications besides object-oriented application 80 can share object cache 60.

The method uses cache dictionary 90 to locate object instances in object cache 60 based on the object ID for a particular object instance. As each new object instance is added to object cache 60, the object instance is registered in cache dictionary 90. More particularly, the object instance's object ID is stored in the cache dictionary 90 along with the location at which the object instance is stored in object cache 60. The cache dictionary can, for example, be organized in a hash table. Given an object ID, the method uses the cache dictionary 90 to determine whether the object instance corresponding to that object ID is currently present in object cache 60. If so, the method returns a reference, for example a pointer, to the object instance's location in object cache 60.

Figure 3:
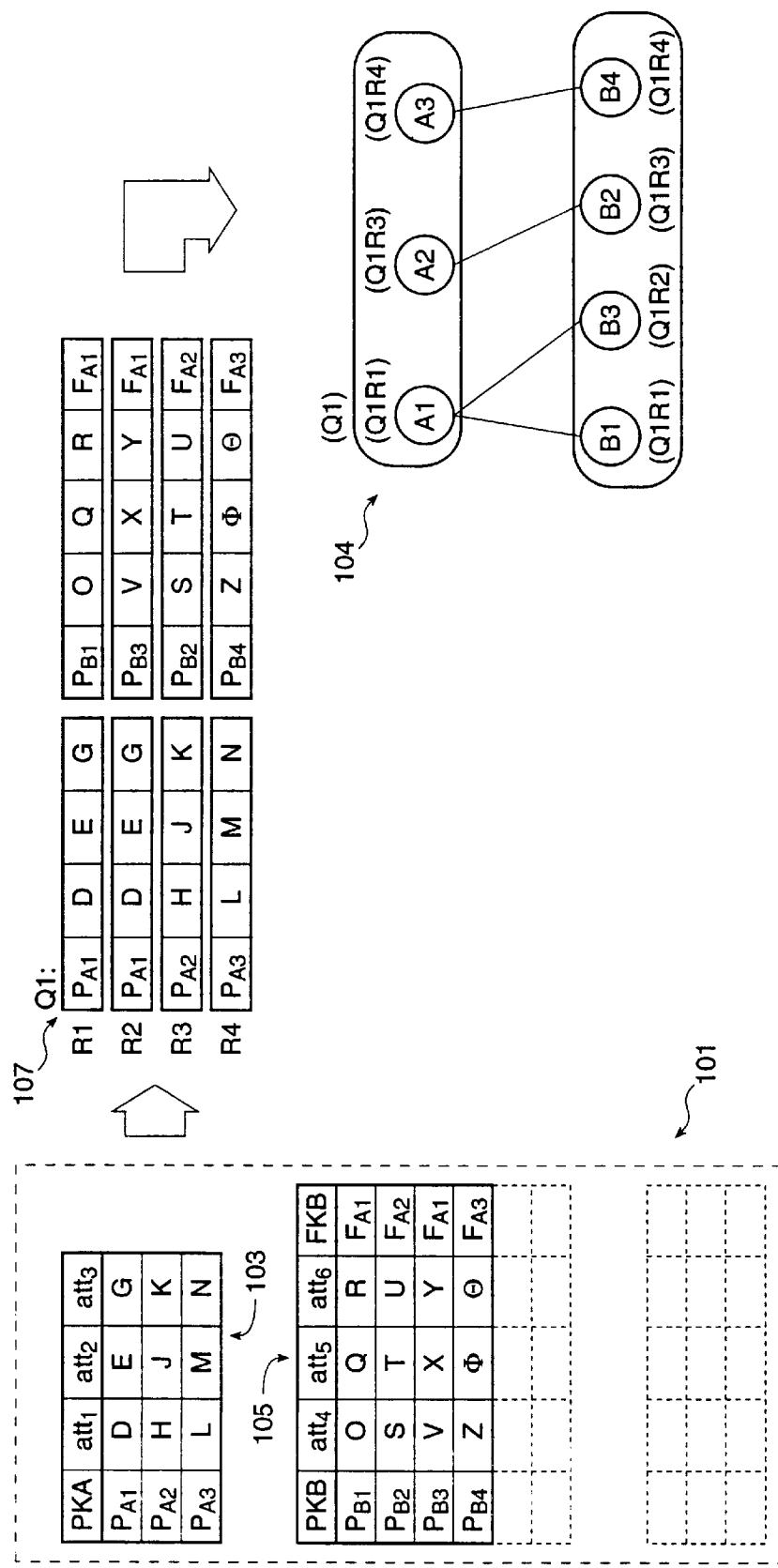
FIG. 3 is a graphical schematic diagram for illustrating a method according to the present invention for populating an object-oriented data structure from data stored in a relational database.

B. Overview of Method for Populating an Object-Oriented Data Structure from Data Stored in a Relational Database FIG. 3 illustrates a method for populating an object-oriented data structure from data stored in a relational database which operates according to the present invention. Relational database 101 includes TABLE A 103 and TABLE B 105 as described in FIG. 1. However, instead of requiring four relational database queries to transform the data in relational database 101 into a network of heterogeneous objects in an object-oriented data structure 104, the method of the present invention requires the results of only a single query, as shown in FIG. 3.

The present invention composes a single query to retrieve all of the records of TABLE A 103 and TABLE B 105 such that foreign key information in a record of TABLE B 105 is equal in value to a primary key in the records of TABLE A 103. An exemplary SQL query is as follows:

SELECT * FROM TableA, TableB WHERE fkB=pkA

The above query produces results table Q1 107 which includes the four rows shown: R1, R2, R3 and R4. This query must at a minimum return the primary and foreign key information required to support the output mapping. The object-to-relational mapping specifies how primary key columns map to object IDs, how data columns map to object attributes, and how foreign key columns map to object relationships. The join query must return results which correspond to the column values specified in the object-to-relational mapping.

According to the invention, the present method then uses an object-to-relational mapping to convert the rows of results table Q1 107 into a network of inter-related objects stored in object-oriented data structure 104 as follows:

The object-to-relational mapping of the method identifies the first portion of row R1 as corresponding to a new object of class A with a class identifier (ID) determined by the corresponding primary key attributes in the first portion of the row. Thus it creates object A1 accordingly, using the appropriate primary key and attribute columns of row R1. The method next identifies the second portion of row R1 as corresponding to a new object of class B and creates object B1 accordingly. The method then uses object-to-relational mapping to convert the foreign key information in the second portion of row R1 into an explicit link L1 between object B1 and object A1 as shown.

At row R2 of results table 107, the method again identifies the first portion of row R2 as corresponding to an object of class A with an object ID specified by the primary key information in row R2. However, before creating the object, the method performs a lookup to object dictionary (not shown) associated with the data structure 104 to determine whether an object A1 having identical attributes already exists in object-oriented data structure 104. Accordingly, the method does not create another duplicate object. The method next identifies the second portion of row R2 as corresponding to a new object of class B and creates an object B3 accordingly. The method then uses the object-to-relational mapping to connect the foreign key information in the second portion of row R2 to create an explicit link L2 between the new object B3 and the existing object A1 as shown in FIG. 3.

From row R3 of results table 107, the method creates two new objects, A2 and B2, and defines a link L3 between them as described above in reference to objects A1 and B1. Similarly, from row R4 of results table 107 the method creates two new objects, A3 and B4, and defines a link L4 between them as described above.

The foregoing describes how the method of the present invention transforms the results of a complex relational-database query which operates on two tables in the relational database into a network of heterogeneous objects. It should be understood, however, that the present invention is not limited to transforming the results of a complex query which operates on two tables; the present invention can transform the results of more complex queries which operate on more than two tables in the relational database as well.

C. Detailed Operation

With reference to the remaining drawings, the details of those features which enable the method of the present invention to transform the results of a complex relational database query into a network of inter-related objects in an object-oriented data structure shall now be described.

Figure 4:
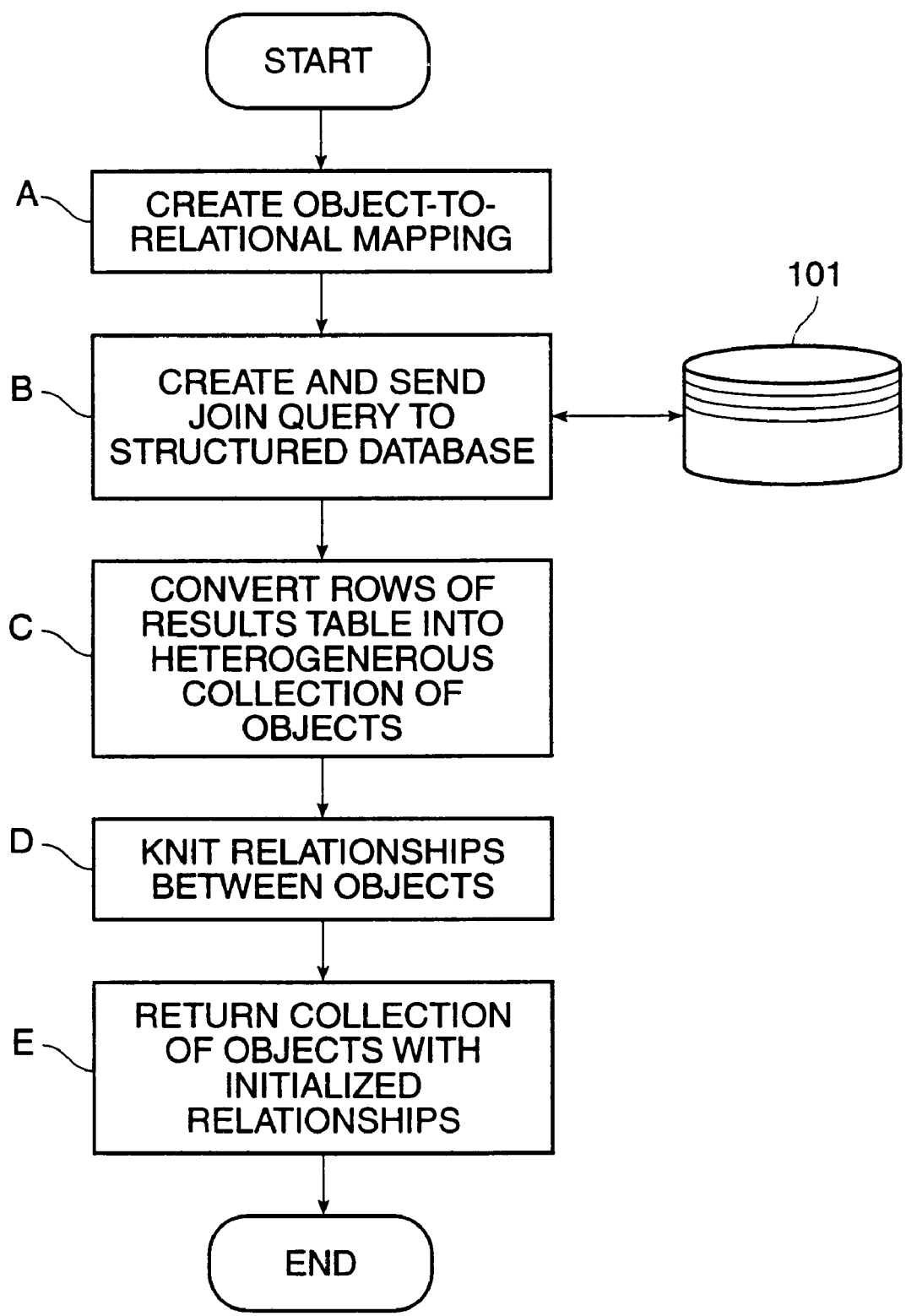
FIG. 4 is a flow chart for illustrating a method according to the invention.

FIG. 4 is high-level flow-chart of the method of the present invention. The process blocks which are shown with a tagged lower right corner will be expanded in subsequent figures. At Step A, the method software 15 creates an object-to relational mapping, and at step B and sends a join query to the relational database 101 comprising for example of tables 103 and 105 (FIG. 3). The relational database 101 responds to the query by providing a results table in which each row includes information from multiple stored tables in the relational database which can be converted by the object-to-relational mapping (Step B). At Step C, the method software converts the rows of the results table into a heterogeneous collection of objects. By "heterogeneous" it is meant that the collection of objects contains objects from more than one object class, such as employee objects and department objects. Next, at Step D, the method software 15 knits the relationships between the objects in the collection. Finally, at Step E, the method software 15 returns with a collection of objects having initialized relationships defined between them.

Figure 5:
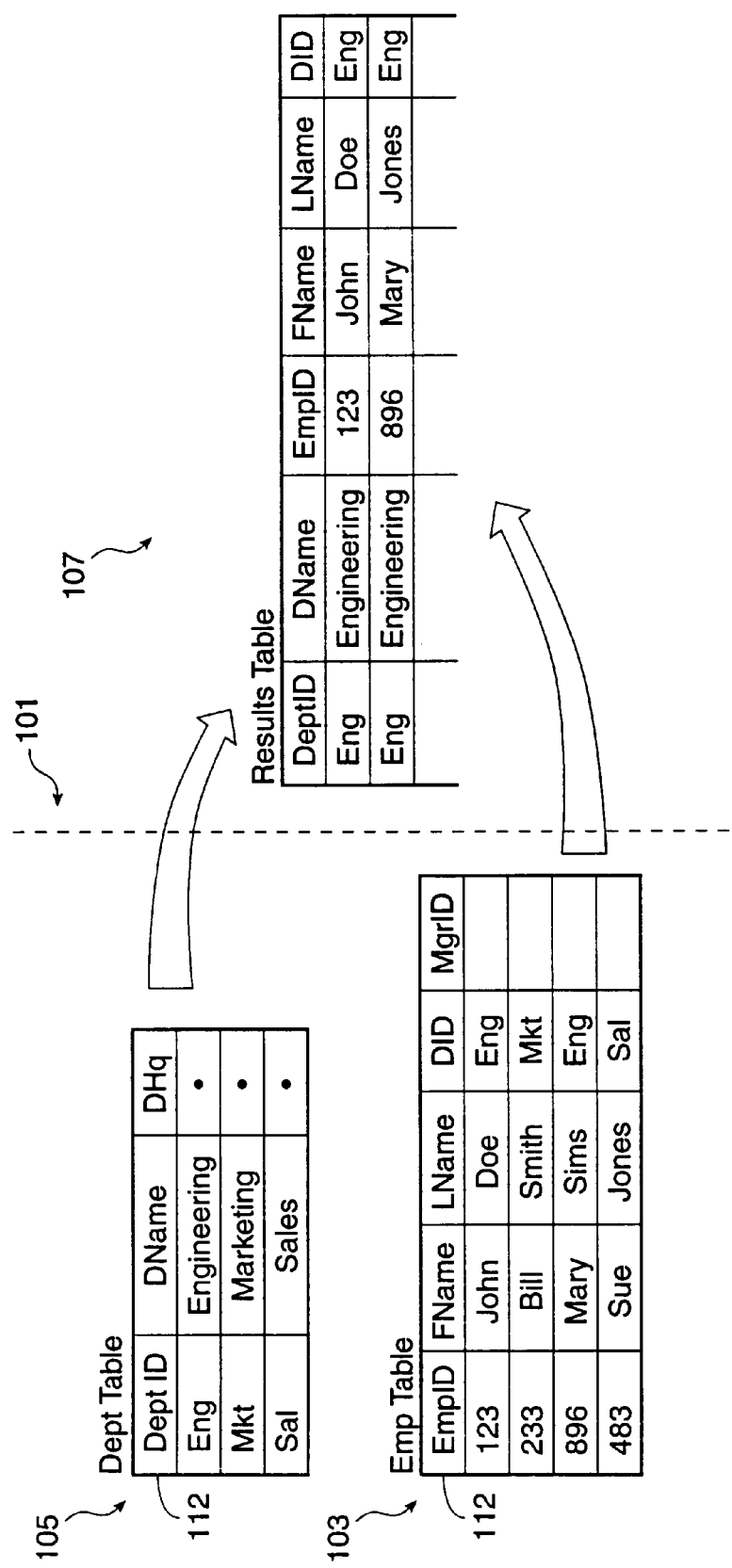
FIG. 5 is a graphical schematic diagram illustrating an example of mapping according to the invention.

The following example provides an illustration of steps shown in FIG. 4. FIG. 5 is a diagram which illustrates a relational database 101 containing two tables: an "EMPLOYEE" table 103 and a "DEPARTMENT" table 105. Each department in the DEPARTMENT table 105 has a primary key, which is the Department I.D. column ("DeptID") 110, and each employee in the EMPLOYEE table 103 has a primary key, which is the Employee I.D. column ("EmpID") 112. Furthermore, each employee reports to or belongs to a department. Therefore, to reflect this relationship, each employee in the EMPLOYEE table includes a Department ID foreign key column ("DID") 114.

The first step is to create an object-to-relational mapping (Step A, FIG. 4). This mapping specifies how a set of database columns maps to an object data structure. In particular, it specifies which primary key columns map to an object ID, which columns map to object attributes, and which foreign key columns map to object relationships. It will be appreciated by one skilled in the art that this mapping could also specify clear inheritance mapping as well as mapping between composite or aggregate objects and database columns.

Specifically, in FIG. 5, the Department Object ID attribute maps to the column "DeptID, the Department object attribute, "Name", maps to the column "DName", and the Employee Relationship "WorkrIn" maps to the foreign key column "DID". The mapping information also determines the cardinality of the employee-department relationship in both directions: each employee is a "WorkrIn" at most one Department and each department "employee" is zero to many employees.

The next step is to issue a query that returns the appropriate information from the database 101. At a minimum, this query must return at least a subset of the columns specified in the object-to-relational mapping for each object class to be instantiated as the result of the query. Specifically, primary key and foreign key columns are required to create objects and knit them together. For example, in applying step B to the relational database of FIG. 5, one might generate a relational database query which states, in essence, "retrieve all the employees who work for this particular department, to wit, the 'engineering' department." What comes back from the database is a results table 107 including several rows such that each row includes both the department information and employee information required to provide the object-to-relational mapping. From the resulting query the results table contains a great deal of overlapping information. Every row has a first portion containing information about the engineering department followed by a second portion which contains information about the specific employee (e.g., the John employee, then the Mary employee, etc.)

Figure 6:
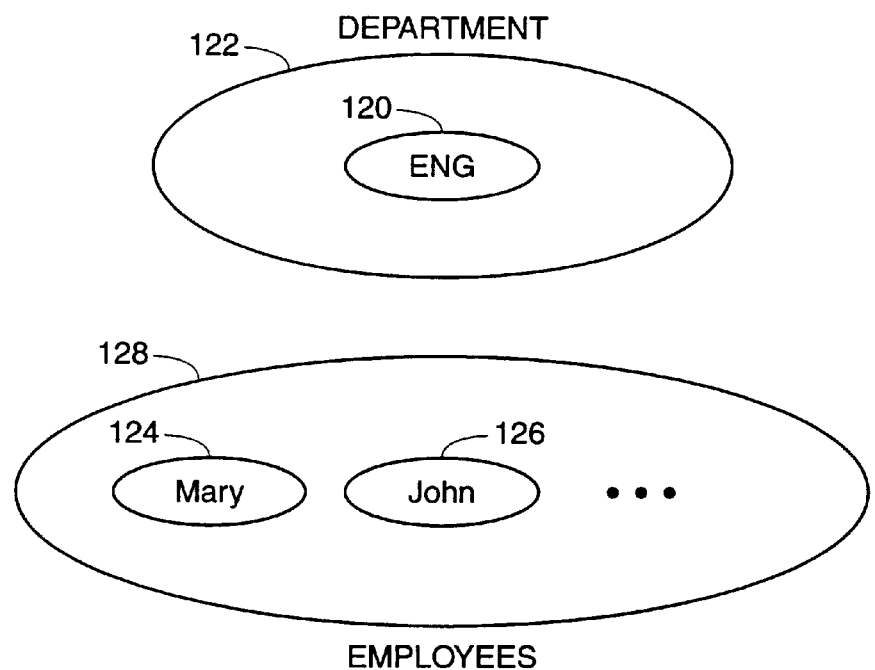
FIG. 6 is a diagram illustrating representations of objects.

The second step (Step C) is to use the object-to-relational mapping to convert the rows of the results table into a heterogeneous collection of unique objects. Specifically, as shown is FIG. 6, the results table is converted into a collection having one object 120 of the DEPARTMENT class, the engineering object, and multiple objects 124,126 of the EMPLOYEE class 128, e.g., the "John" object, the "Mary" object, etc.

The next step (Step D) is to knit the relationships between the objects in the collection according to the relationship defined in the object-to-relational mapping and included in the query result table. There may be several different relationships between the objects of different classes. For example, referring to FIG. 7, there is the relationship 130 between a department and its employees, i.e., each department has one or more employees. Likewise, there is a separate relationship 132 between an employee and his/her department, i.e., each employee belong to one and only one department. The present invention differentiates between the two relationship 'arcs' 130, 132. Furthermore, there may be other relationships such as the management relationships 134, 136 between one employee in the EMPLOYEE table and another employee in the same table.

Thus in the present example, the Engineering Department object has a relationship with the Mary and John employee objects, and each employee has a relationship to one department. Furthermore, the Mary object 124 manages the John object 126.

Figure 8A:
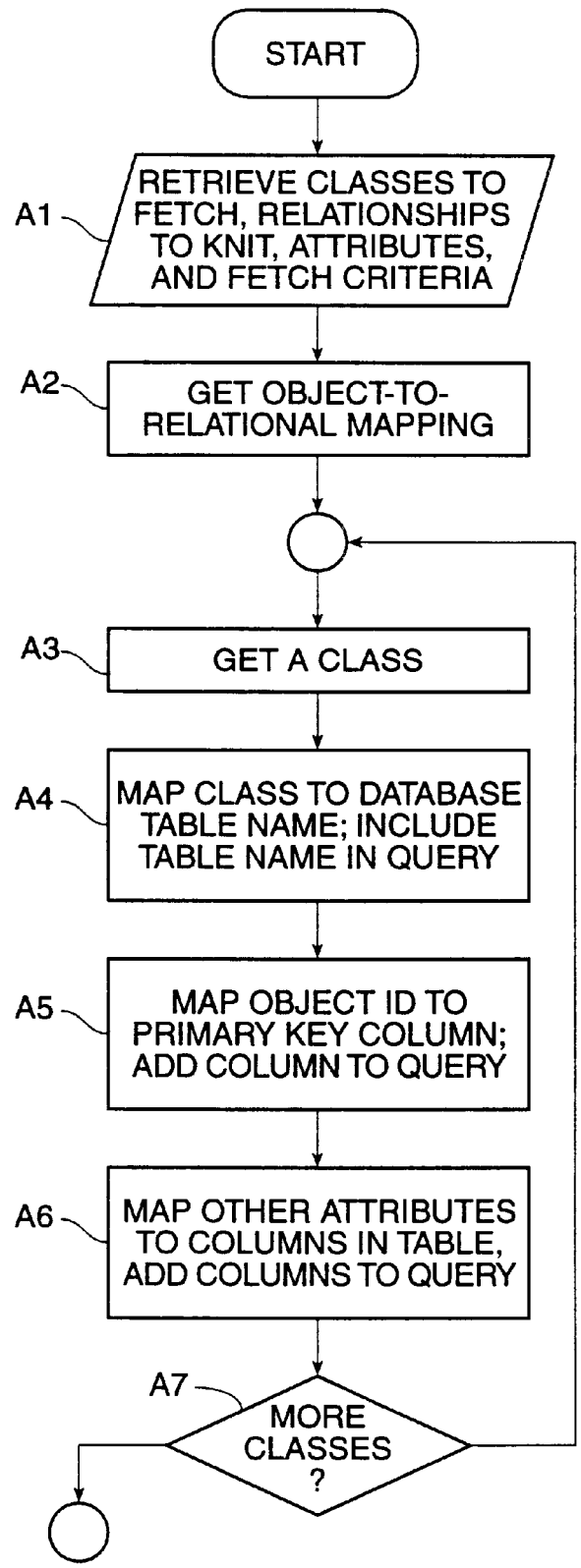
FIGS. 8A and 8B are together a further flow chart of a method in accordance with the invention.
Figure 8B:
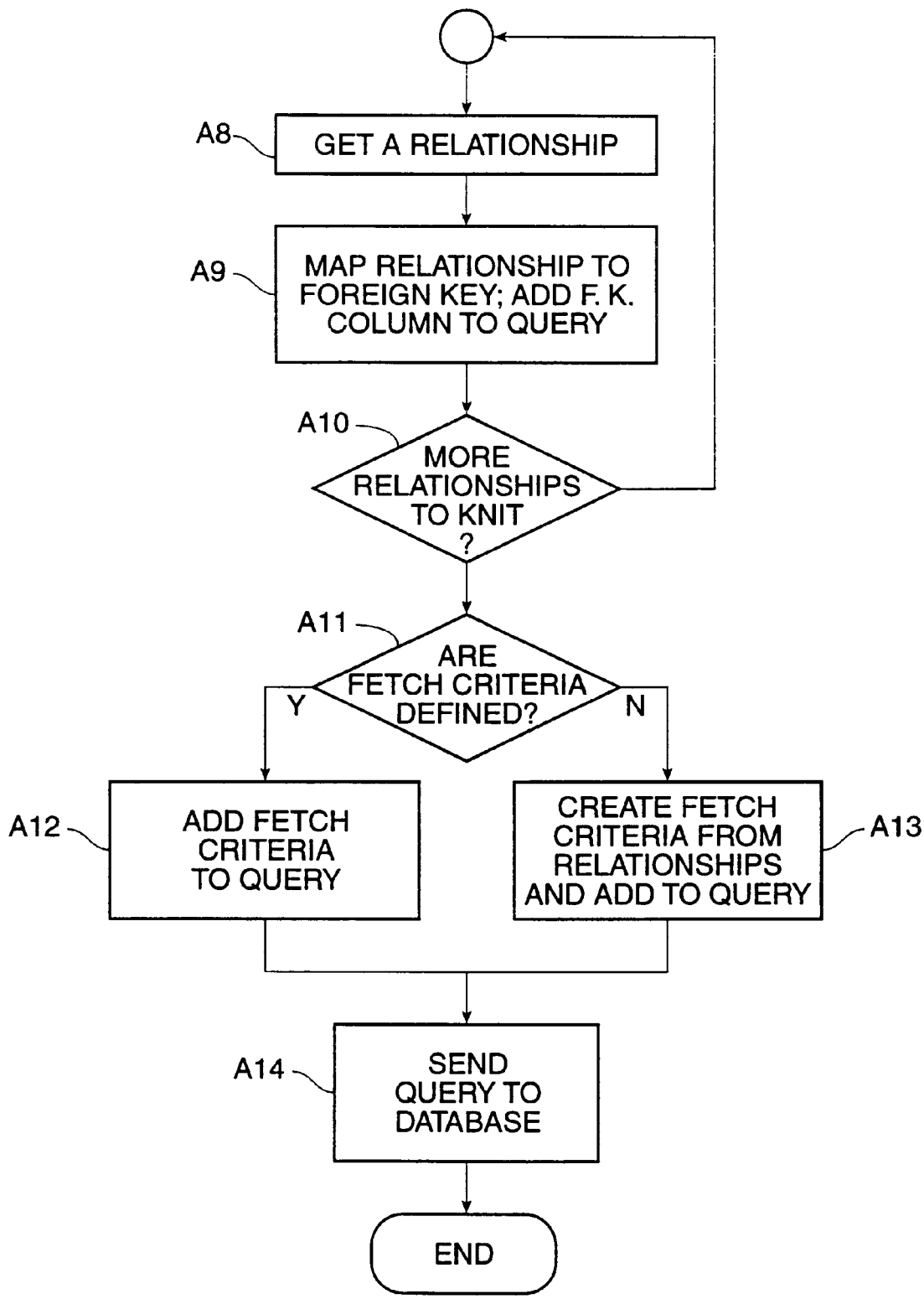

FIGS. 8A and 8B are together a flow chart of a method for forming an SQL join query from a list of desired information prepared by the user. The user specifies which object classes are involved, which relationships to knit and the SQL "where" clause. It is an expansion of the first process step of FIG. 5. Prior to executing this method, it is assumed that the user has specified—by some method which is outside the scope of the present invention—the object classes of interest (e.g., the EMPLOYEE and DEPARTMENT classes), the relationships to knit (e.g., the one-to-many relationship between a department and its employees and the one-to-many relationship between an employee and other employees), the table attributes desired (e.g., department ID and department name from the DEPARTMENT table, and the employee ID, employee name, and department foreign key from the EMPLOYEE table), and the fetch criteria (e.g., only those employees in the engineering department). At step A1, therefore, the method retrieves this information from, for example, the user interface, or from a pre-stored list or record. At step A2, the system software gets the object-to-relational mapping.

At step A3, the method gets a class from the list of classes specified by the user as input to the query step. Then, at step A4, the method uses the object-to-relational mapping to map the class to a table in the relational database and includes the table name in the SQL join query being formed. Next, at step A5, the method maps the object ID attributes for that class to the primary key column of the mapped table. The method then includes the primary key column in the attribute field of the SQL join query. At step A6 the method maps the other object attributes selected for that class to columns of the mapped table and includes these columns in the SQL join query as well. At step A7, the method determines whether there are remaining classes to be mapped. If so, then the method gets another class from the user-created record and repeats steps A3 through A7 as appropriate.

When no more classes remain to be mapped to the query, then at step A8, the method gets a relationship to knit from the list of relationship specified by the user. Next, at step A9, the method uses the object-to-relational mapping to map the relationship to knit to a foreign key column of one of the tables identified in the previous paragraph and includes the foreign key column in the SQL join query. At step A10, the method determines whether there are other relationships to knit. If so, then the method gets another relationship to knit and repeats steps A8 through A10 as appropriate.

When there are no other relationships to be mapped to the query, then, at step A11 the method determines whether fetch criteria have been specified by the user. If the user has specified fetch criteria (e.g., where the department foreign key equals "engineering"), then at alternate step A12, the method adds the fetch criteria to the SQL join query. If the user has not specified fetch criteria, then at alternate step A13 the method derives the fetch criteria from the "relationships to knit" specified by the user and the object-to-relational mapping, and then it includes the derived criteria in the SQL join query. At step A14, the method sends the completed SQL join query to the relational database.

Figure 9A:
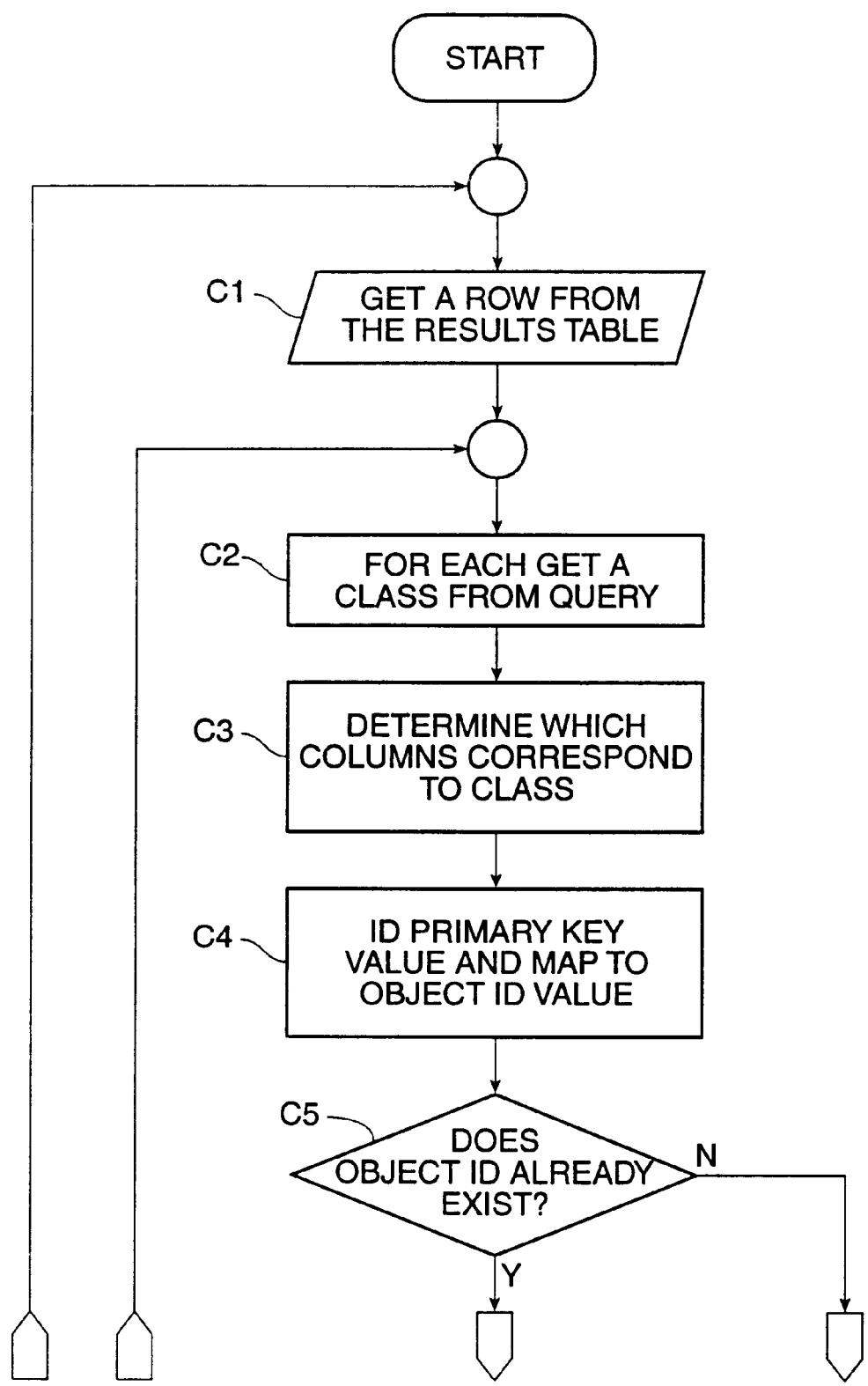
FIGS. 9A and 9B are together a further flow chart of a method in accordance with the invention.
Figure 9B:
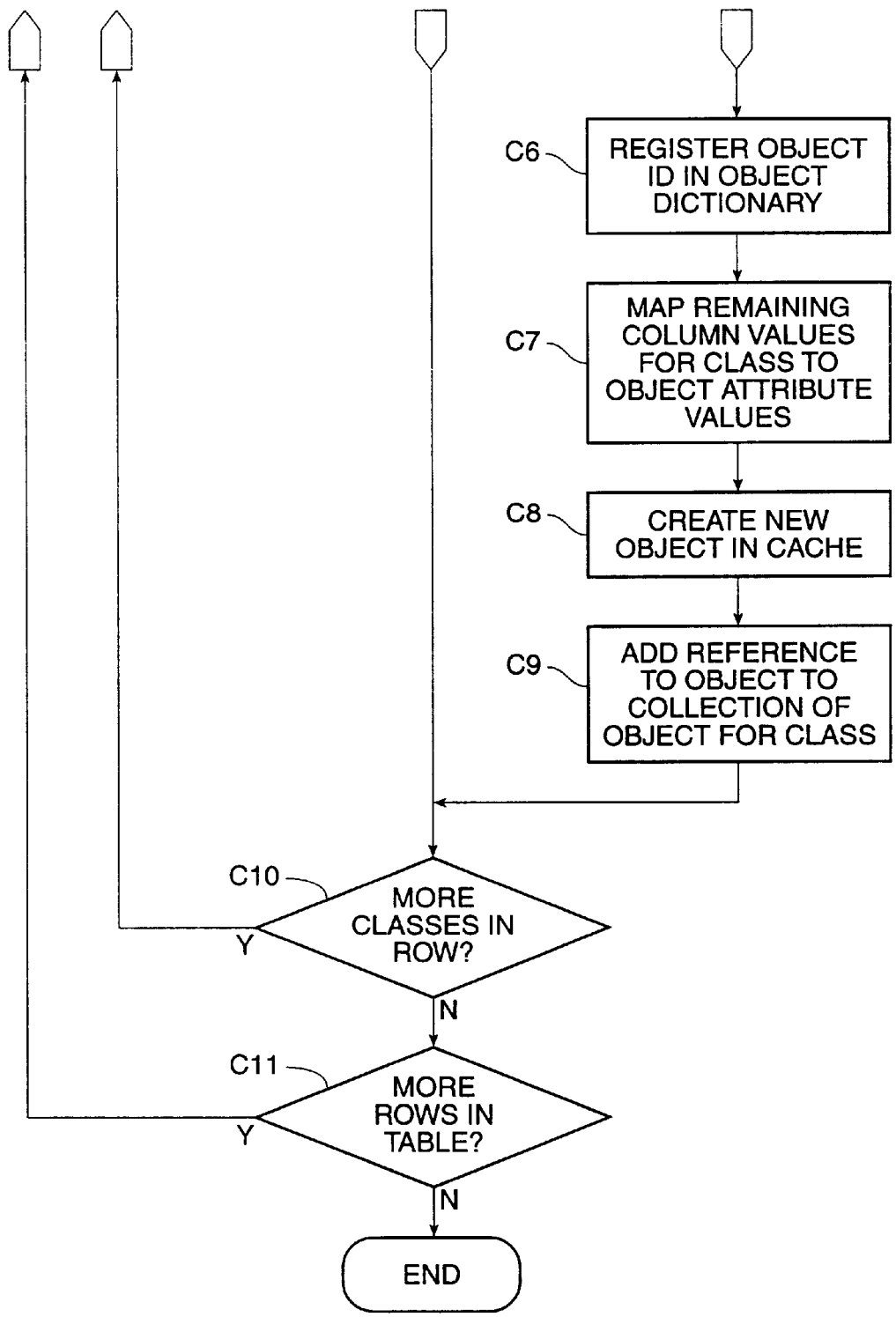

FIGS. 9A and 9B together form a process flow diagram of a method for converting the rows of the results table into a heterogeneous collection of objects. It is an expansion of the step C of FIG. 4. At step C1, the method retrieves a row from the results table. At step C2, the method gets a class name from the query. At step C3, the method then determines which of the columns in the row correspond to the specified class name. Then the method, at step C4, uses the object-to-relational mapping to identify the primary key value for the class and maps it into a object ID value for that class.

At step C5, the method performs a look up in the object dictionary to determine whether an object having an identical object ID already exists in the object cache. If not, then the method, at step C6, the method registers the object ID of the new object in the object dictionary so that, the next time through, the object will not be duplicated.

At step C7, the method maps the remaining column values associated with the class into object attributes for the new object to be created according to the object-to-relational mapping. Then, at step C8, the method creates a new object having those attributes and at step C9 adds a reference to the object to the collection of objects for that class. At step C10, the method determines whether there are other classes represented in the row. If so, then for the next class name from the query, the method repeats the steps C2–C10 as appropriate.

If no other classes represented in the row, then at step C11, the method retrieves the next row returns to step C1 of the method. However, referring to the results table 107 of FIG. 5, one can expect that the processing will be different on the next time through. With the first row, no "engineering" instance of the DEPARTMENT class had been created. However, the first portion of the second row, which corresponds to the DEPARTMENT class, is identical to the same portion of the first row. Hence, for the second row, the method will determine at that an object having an ID "Eng" already exists. Therefore, the method will jump to step C10. At this step, the method will determine that there are other classes represented in the row, namely, the EMPLOYEE class. This is the first time that the method has identified a "Mary" object (i.e., object ID "896"). Hence, at step C11, the method will proceed to perform steps C1-C10 thus leading to the creation of a "Mary" object among the collection of EMPLOYEE objects. The result of the method illustrated in FIGS. 9A and 9B is a collection of heterogeneous objects from various object classes which are not linked in any way.

Figure 10:
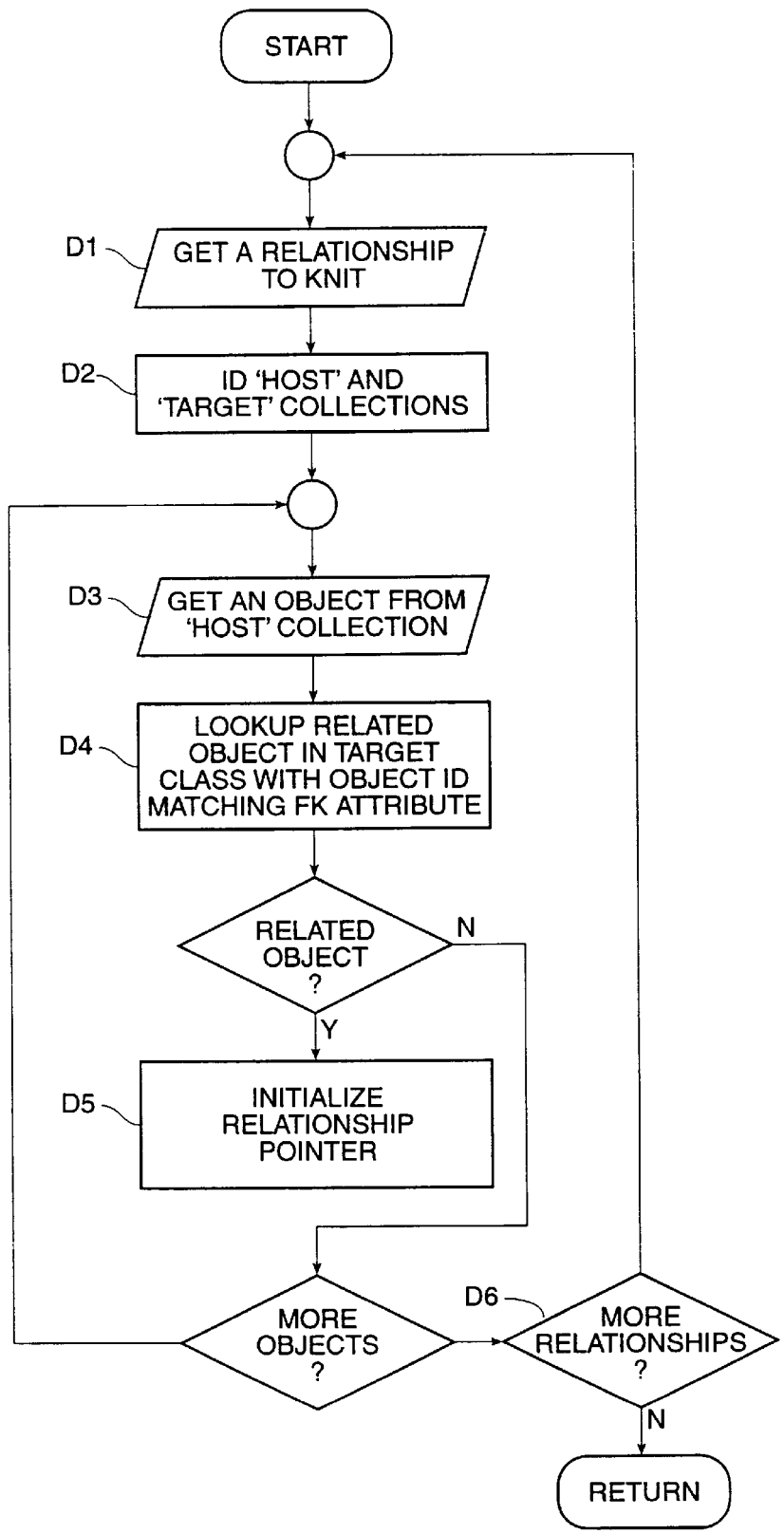
FIG. 10 is a still further flow chart of a method in accordance with the invention.

FIG. 10 is a process flow diagram of a method for knitting the collection of objects together according to the present invention. It is an expansion of the step D in FIG. 4. At step D1, the method gets a "relationship to knit" from the list of relationships specified by the user as input to the query step. For that relationship, the method uses the object-to-relational mapping to identify at step D2, which of the classes of objects created in the preceding step "hosts" the foreign key values which correspond to the specified relationship. The method designates the class of objects containing the foreign key the "host" class. The method likewise designates the class of objects containing the corresponding primary key values is the "target" class.

Figure 11:
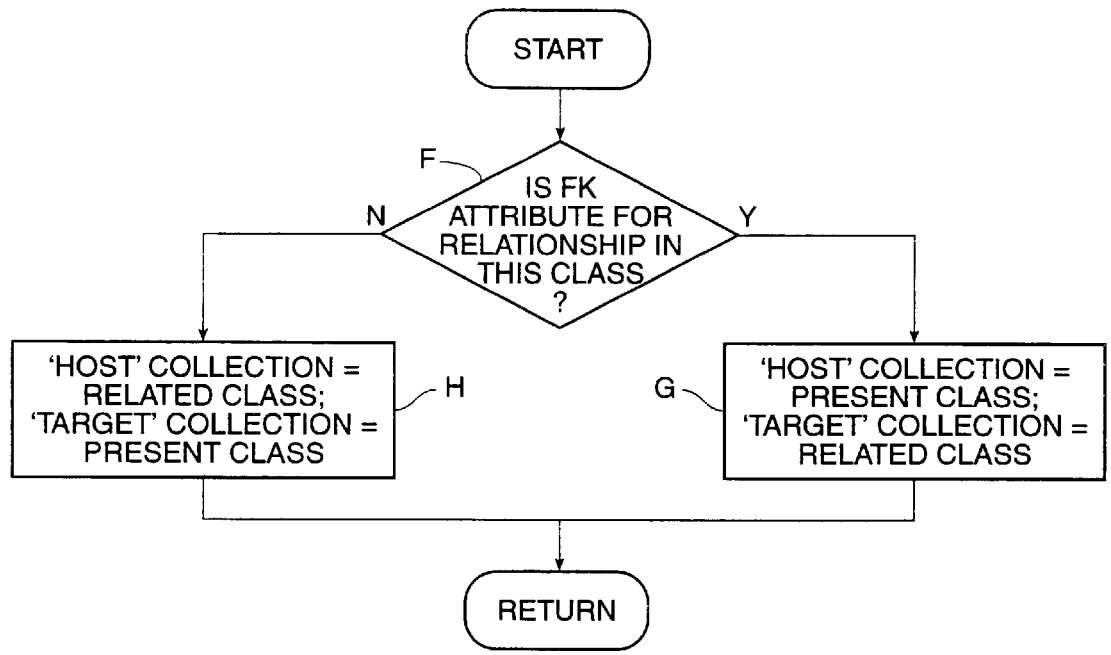
FIG. 11 is a still further flow chart of a method in accordance with the invention.

FIG. 11 is a process flow diagram for a method for identifying the "host" and "target" classes for a given relationship. At step F, the method determines whether a given class contains the foreign key for the specified relationship. If so, then at step G, the method sets the "host" class equal to the class in question, and sets the "target" class equal to the related class. If the class in question does not contain the foreign key information, then at step H, the method sets the "host" class equal to the related class, and sets the "target" class equal to the class in question. For example, Employee 1, the host of the foreign key referring to the working relationship and Department, is the target.

Referring again to FIG. 10, at step D3, the method retrieves an object from the "host" collection. For that object, the method identifies at step D4 whether there is an object in the "target" collection which corresponds to it. If there is a related object, at step D5, the method initializes a relationship pointer for the relationship to indicate the relationship between the two objects. These steps D3–D5 are performed for each object in the "host" class.

After each object in the host class has been processing in the manner, the method next determines at step D6 if there are other relationships to knit. If so, then the method returns to step D1 and repeats steps D1–D6 as appropriate. If there are no other relationships to knit, then the method returns the collection of objects with initialized relationships.

Figure 7:
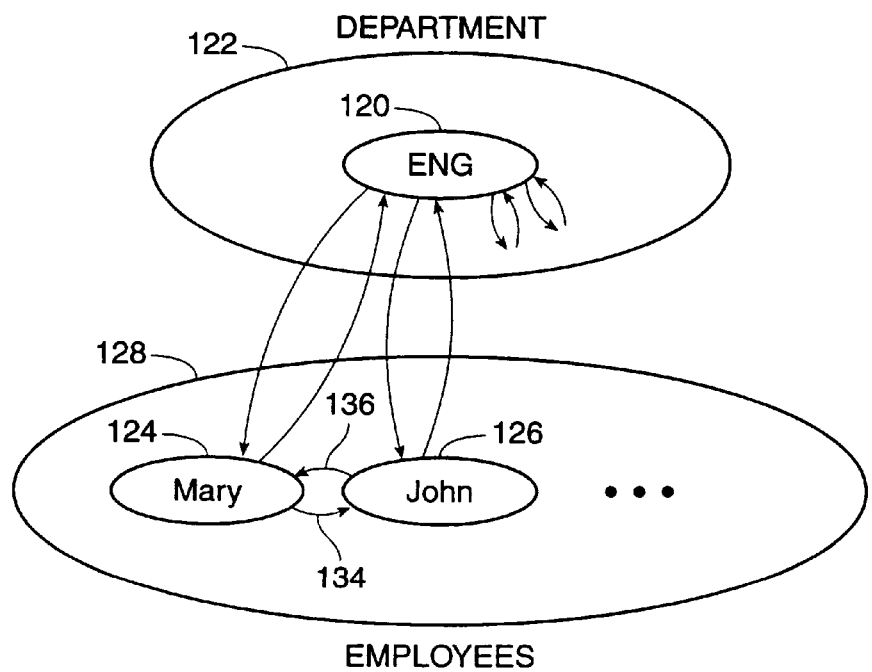
FIG. 7 is a diagram illustrating mappings between representations of objects.
Figure 12:
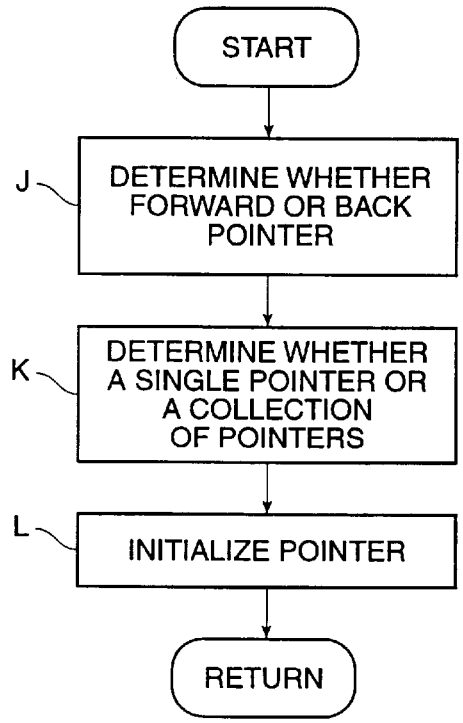
FIG. 12 is a still further flow chart of a method in accordance with the invention.

FIG. 12 is a process flow diagram for a method of initializing relationship pointers according to the present invention. At step J, the method determines from the user specified "relationship to knit" whether the pointer to be initialized is a forward pointer (i.e., from the object in the host class to the related object in the target class) or a back pointer (i.e. from the object in the target class to the related object in the host class). Referring to FIG. 7, an example of a forward pointer is a pointer from an employee object to its related department because each employee object contains foreign key information. An example of a back pointer is a pointer from a department object to its related employees because the department objects do not contain foreign key information.

At step K of FIG. 12, the method next determines from the user-specified "relationship to knit" and the object-to-relational mapping whether a single pointer is to be set in the object, or multiple pointers. For example, when the relationship between the object to contain the pointer and the object which will be pointed to is a one-to-one relationship, then only a single pointer will be set. However, when the relationship between the object to contain the pointer and the object(s) which will be pointed to is a one-to-many relationship, then a collection of pointers will be set in the objects. An example of a one-to-one relationship is the relationship between an employee and his/her department. An example of a one-to-many relationship is the relationship between a department and its employees.

At step L, the method initializes the pointer according to the outcome of the previous two steps.

Figure 13:
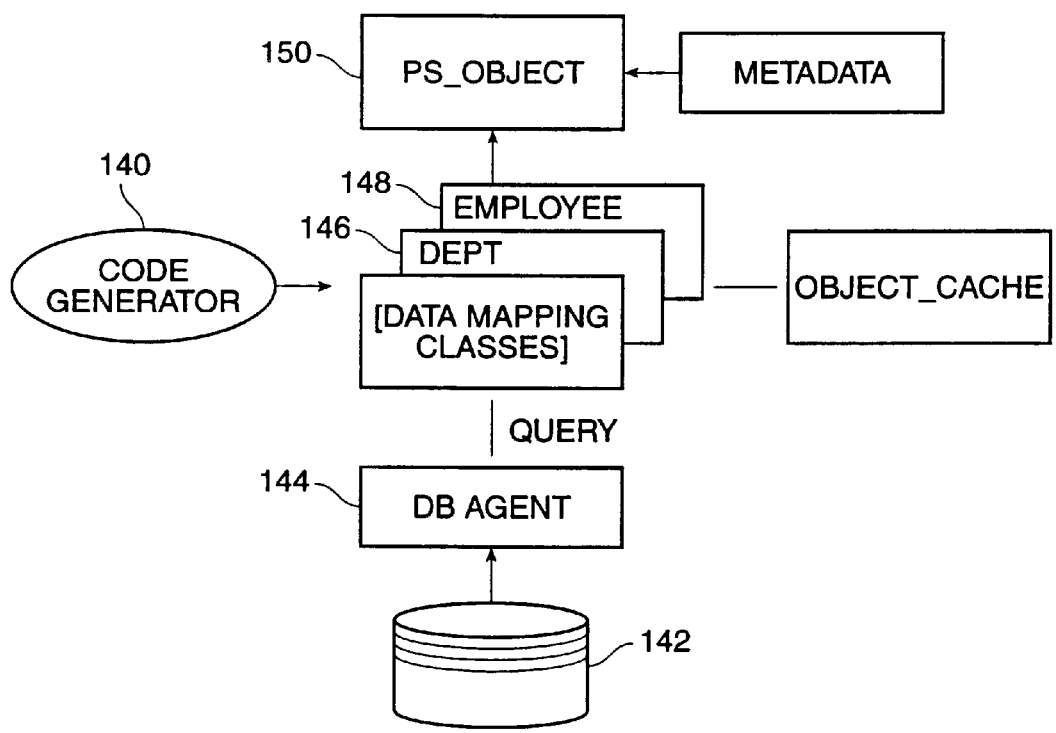
FIG. 13 is a block diagram of the elements in an apparatus according to the invention.

FIG. 13 is a conceptual diagram of a high level architecture of a system suitable for implementing the method of the present invention. Code generator 140 generates the data mapping classes which contain specific object-to-relational mapping information about how they map to relational databases 142. The data mapping classes utilize a database agent 144 to actually communicate with the relational databases 142. In the present case, for example, there might be a DEPARTMENT data mapping class 146, and an EMPLOYEE data mapping class 148. The data mapping classes 146, 148 in turn inherit many of their characteristics from a higher lever PS_Object Class 150. The PS Object class 150 gives all of the data mapping classes their basic capabilities (e.g., create, update, delete).

The data mapping classes use the DB agent class to implement various methods, the most important of which is the "query" method. The "query" method is the method that actually implements the SQL join query. The query method works as follows: A call to the query method is made on a particular class (e.g., the department class). With the call is provided a list of other related classes, the relationship to knit and the search criteria. What is returned from the query call is a collection of department objects with initialized relationships to their employee objects.

CONCLUSION

While the above is a complete description of the preferred embodiment of the inventions, various alternative, modifications and equivalents may be used. For example, the data mapping classes may be produced statically by a code generator, or dynamically, through meta-data. In a dynamic implementation, the object-to-relational mapping is determined completely from the meta-data. Therefore, the above description should not be taken as limited the scope of the invention which is defined by the appended claims.

What is claimed is:

1. In a computer system, a method for populating a searchable object cache from data stored in a structured relational database, said method comprising the steps of:

using a join query to retrieve at least one row of data from said structured relational database, wherein each of said at least one row contains primary and foreign key attributes from at least two tables stored in said structured relational database, said at least two tables being related by foreign-key/primary-key information;

instantiating a network of inter-related heterogeneous objects in said object cache from said at least one row of data, including sub-steps performed for each row as follows:

mapping said row into at least two objects for instantiation, wherein each of said at least two objects has attributes correlating to a subset of data in said row;

defining at least one relationship between said at least two objects, wherein said at least one relationship correlates to said foreign key/primary key information; and suppressing an object instantiation if an identical object instance is found to exist in said searchable object cache.

2. In a computer system, a method for populating a searchable object cache from data stored in a structured relational database, said method comprising the steps of:

using a join query to retrieve at least one row of data from said structured relational database, wherein each of said at least one row contains primary and foreign key attributes from at least two tables stored in said structured relational database, said at least two tables being related by foreign-key/primary-key information;

instantiating a network of inter-related heterogeneous objects in said object cache from said at least one row of data, including sub-steps performed for each row as follows:

mapping said row into at least two objects for instantiation, wherein each of said at least two objects has attributes correlating to a subset of data in said row; and defining at least one relationship between said at least two objects, wherein said at least one relationship correlates to said foreign key/primary key information, wherein said instantiating step further comprises the sub-steps of:

comparing a mapped object to existing object instances in said object cache;

determining whether an object instance having an object ID identical to said mapped object already exists in said object cache;

instantiating said mapped object in the event no object instance having identical object ID exists; and suppressing an instantiation of said mapped object in the event there is an object instance having identical object ID.

3. The method of claim 2, wherein said step of defining one or more relationships comprises the steps of:

creating for each of said two or more objects, a pointer to a related object, wherein each of said two or more objects may have plural pointers to plural objects.

* * * * *